(12) United States Patent
Mott

(10) Patent No.: US 7,950,520 B2
(45) Date of Patent: May 31, 2011

(54) MODULAR CONVEYOR BELT SUPPORT IDLER

(75) Inventor: George T. Mott, Alburtis, PA (US)

(73) Assignee: ASGCO Manufacturing, Inc., Allentown, PA (US)

( * ) Notice: Subject to any disclaimer, the term of this patent is extended or adjusted under 35 U.S.C. 154(b) by 2124 days.

(21) Appl. No.: 10/619,082

(22) Filed: Jul. 14, 2003

(65) Prior Publication Data

US 2004/0079621 A1    Apr. 29, 2004

Related U.S. Application Data

(60) Provisional application No. 60/395,538, filed on Jul. 12, 2002.

(51) Int. Cl.
*B65G 15/08* (2006.01)
(52) U.S. Cl. ......... 198/826; 198/824; 198/825; 198/830
(58) Field of Classification Search .................. 198/818, 198/820, 824, 825, 826, 828, 829, 830
See application file for complete search history.

(56) References Cited

U.S. PATENT DOCUMENTS

| | | | | |
|---|---|---|---|---|
| 809,227 A | * | 1/1906 | Steckel | 198/826 |
| 1,530,499 A | * | 3/1925 | Knode | 198/830 |
| 3,259,227 A | * | 7/1966 | Steinmetz | 198/501 |
| 5,988,361 A | * | 11/1999 | Giacomin et al. | 198/830 |
| 6,427,828 B1 | * | 8/2002 | East et al. | 198/826 |
| 6,634,490 B2 | * | 10/2003 | Fischer et al. | 198/826 |
| 7,467,707 B1 | * | 12/2008 | Gabhart | 198/818 |
| 7,621,391 B2 | * | 11/2009 | Matters et al. | 198/825 |
| 7,762,387 B2 | * | 7/2010 | Dunn | 198/823 |
| 7,837,030 B2 | * | 11/2010 | Daly et al. | 198/861.1 |

OTHER PUBLICATIONS

Literature on product developed by Saguaro Conveyor Equipment, Inc., Apr. 2000 (two pages).
Literature on Trac-Mount® Idler manufactured by Martin Engineering Co., Oct. 1, 1992 (one page).

* cited by examiner

*Primary Examiner* — Douglas A Hess
(74) *Attorney, Agent, or Firm* — Dann, Dorfman, Herrell & Skillman, PC

(57) ABSTRACT

A support for a conveyor belt is provided. The support has a series of frames that may be installed beneath the underside of the conveyor belt to support the underside of the belt in a trough-shaped arrangement. Each frame supports a guide element, such as a roller, slider bar or bearing block, that permits the belt to ride over the frames. The frames may be installed beneath the belt and removed from beneath the belt from one side of the conveyor belt. Installation and removal of the components require minimal side clearance beneath the belt. As a result, the support may be installed and removed with minimal interference from adjacent structures or fixtures beneath the belt.

17 Claims, 9 Drawing Sheets

Fig. 13

MODULAR CONVEYOR BELT SUPPORT IDLER

RELATED APPLICATIONS

This non-provisional application claims the benefit of the filing date of U.S. Provisional Application No. 60/395,538, filed Jul. 12, 2002, the entire disclosure of which is incorporated herein by reference.

FIELD OF THE INVENTION

The present invention relates to a support for a conveyor belt, and more specifically to a support for idler rollers that may be installed and removed from one side of a conveyor belt with minimal interference from adjacent structures or other components beneath the belt.

BACKGROUND

Many conveyor belts are supported in a trough-shaped manner. Such belts have a generally horizontal center section and a pair of inclined side sections that extend generally outwardly and upwardly from the center section. Trough-shaped conveyor belts are typically supported by a series of idler rollers mounted on support frames spaced beneath the underside of the belt. The support frames may have one or more idler rollers that engage the underside of the belt and provide a surface on which the belt can ride as it conveys materials or loads. During maintenance, the frames and rollers are typically accessed by reaching underneath the belt from the sides of the conveyor belt.

The maintenance of rollers and support frames is often made difficult when two or more adjacent support frames are spaced close together or the support frame is adjacent to another structure. Support frames are frequently spaced at close intervals. When materials are loaded on to a conveyor belt, the belt may deflect in response to the impact of materials being dropped on the belt. To minimize deflection, support frames are placed at close spacings beneath the conveyor belt. In some cases, the support frames are spaced on 8 to 12 inch centers. Removal of a conventional support frame typically requires tilting the frame to one side so that the taller side sections of the frame, clear the underside of the belt at its lowest point. This often requires tilting the frame toward an adjacent frame. The close proximity of adjacent support frames or other structures often limit how much a frame may be tilted, making removal of the rollers and support frame difficult or impossible. If space for tilting the frame is limited, the servicing of a damaged frame or roller may require the disconnection and removal of several support frames located in the vicinity of the damaged frame or roller.

The servicing of idler support frames and rollers may also be hampered where one side of the conveyor belt is not accessible because of some other structure. For example, the conveyor belt assembly may be positioned against or near a wall that limits or prevents access to anchor bolts at the bottom of the support frames on the side of the belt adjacent to the wall. Where modular support frames are used, the wall may prevent access to the side of the frame that is positioned closest to the wall. Accordingly, there is a need for a conveyor belt support assembly that can be installed and easily removed from one side of the conveyor belt, and without the need to disturb adjacent walls or the mounting structure of base supporting the belt assembly.

SUMMARY OF THE INVENTION

A support apparatus is provided for a conveyor belt. The support may be used beneath the conveyor belt to support the center and side sections of the belt in a trough shape. The support preferably has a series of frames that align with one another to support the belt. One or more guide elements may be mounted on the frames to permit the belt to ride over the frames. The frames are preferably installed and removed from one side of the conveyor belt to permit easy servicing of the frames and guide elements from one side of the belt. In this arrangement, the frames may also be installed and removed with minimal interference from adjacent supports or components beneath the belt.

The frames may be installed and removed by accessing the underside of the conveyor belt. When a guide element requires maintenance, one or more frames on the support may be removed from beneath the belt to access the guide element requiring maintenance. In one embodiment, rollers are mounted on the frames. A first side roller is mounted on a first side frame, a second side roller is mounted on a second side frame and a center roller is mounted on a center frame. The frames and rollers may be installed and removed from an accessible side of the conveyor belt in instances where the opposite side of the belt is inaccessible.

Two or more rollers may be connected together during installation and removal of the rollers. For example, a first side roller may be connected to the center roller that permits both rollers to be installed and removed from the accessible side as a unit. The rollers are supported on frames and the frame may include a ramp that guides the side roller into position beneath the belt on the side adjacent the wall. The support apparatus may include connectors to secure the frames and rollers beneath the belt, in accordance with the preferred arrangement of the present invention, the connectors being reachable from the accessible side of the belt.

DESCRIPTION OF THE DRAWINGS

The foregoing summary as well as the following description will be better understood when read in conjunction with the figures in which.

DETAILED DESCRIPTION OF THE PREFERRED EMBODIMENT

The present conveyor support idler arrangement provides a conveyor belt support that may be used with a conveyor belt that is configured in a trough-shape. The support may be accessed and serviced from one side of the conveyor belt. In addition, the support may be installed beneath the conveyor belt and removed from beneath the conveyor belt without tilting the support frame toward adjacent frames or other obstructions beneath the conveyor belt. One or more guide elements may be mounted on a center frame that supports a center portion of the conveyor belt. The support may also have one or more inclined guide elements mounted on side frames that support the inclined sides of the conveyor belt.

The support may have a first side support frame, a second side support frame and a center support frame between the side support frames. Each of the frames supports one or more guide elements, e.g., rollers, that engage the underside of a conveyor belt. The support frames may be installed and removed from one side of the conveyor belt without the need for tilting the support frames toward adjacent supports. In one embodiment, the center support frame and second side support frame are detachably connected to one another and may be installed and removed together from one side of the conveyor belt, e.g. a side at which access is convenient.

Figure 1:
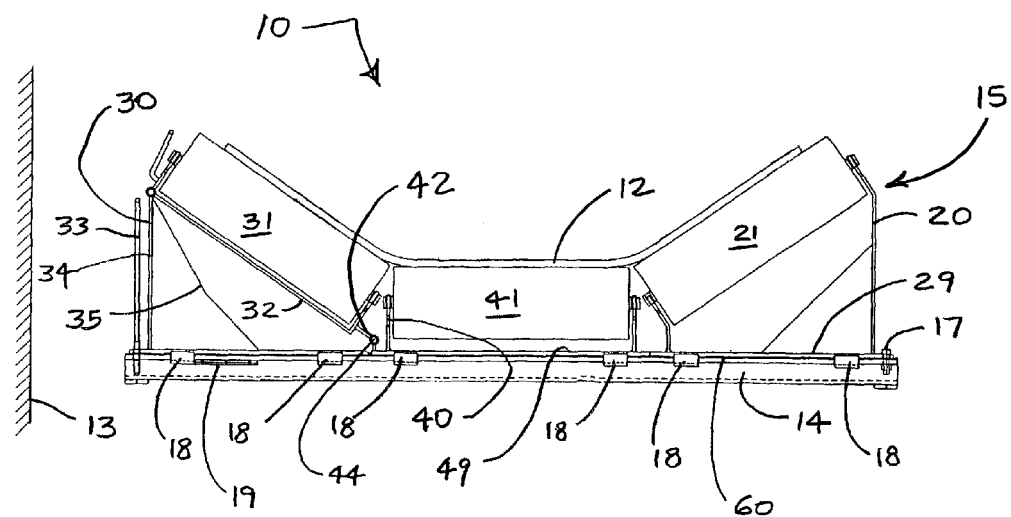
FIG. 1 is an elevational view of a conveyor belt support in accordance with the present invention, shown supporting a conveyor belt in a trough-shaped manner.

Referring to FIGS. 1-14 in general, and to FIG. 1 specifically, a support apparatus or assembly in accordance with the present invention is shown and designated generally as 10. The support 10 is mounted on a substantially linear base member 14 and is configured to support conveyor belt 12 in a trough-shaped arrangement. The support 10 may be used in conjunction with a plurality of adjacent supports spaced beneath the length of a conveyor belt.

The support 10 may have any number of frames and rollers configured to support the trough-shaped conveyor belt. In FIG. 1, the support 10 is shown with a first side frame 20, a second side frame 30 and a center frame 40 between the first and second side frames. A center roller 41 is mounted on the center frame 40 and is configured to support the center section of the conveyor belt 12. A first side roller 21 is mounted on the first side frame, and a second side roller 31 is mounted on the second side frame 30. Side rollers 21, 31 are configured to support the side sections of the conveyor belt 12 in an inclined manner. The rollers are mounted on the frames using any suitable connection, bearing, or mounting technique.

The frames 20, 30 and 40 slidably engage the base 14 and are removable with minimal interference from adjacent supports. In addition, the support 10 is preferably configured to permit removal of frames 20, 30 and 40 from one side of the conveyor belt. Referring to FIG. 1, the conveyor belt 12 is positioned near a structure or wall 13 that limits access to one side of the conveyor belt 12 on the side facing the wall. As such, the underside of the conveyor belt 12 may be serviced from an accessible side 15 opposite the side facing the wall 13.

Figure 13:
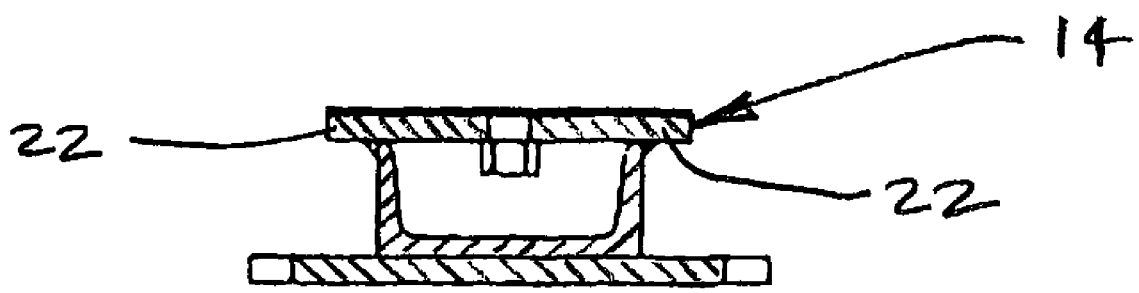
FIG. 13 is a sectional view of a base shown in FIG. 2.

The support 10 will now be described in greater detail. Preferably, support 10 is arranged as an assembly of modular elements, e.g., elements including side rollers 21, 31 and center roller 41. The support assembly 10 is configured to slidably engage a narrow elongated track or base 14 having an overhanging top member providing cantilevered edges 22, as shown in FIG. 13. The cantilevered edges 22 on the base form a track that permits sliding displacement of the frames beneath the conveyor belt. The first frame 20 is removably attached to the base 14 using any suitable fastener, such as a bolt or a pin. In FIG. 1, the first frame is connected to the base 14 with a bolt 17 on the accessible side 15 of the base. The first frame 20 has a bottom plate 29 with a hole that aligns with a hole in the base 14 to accommodate the bolt 17. As such, the first frame 20 is secured to the base 14 by aligning the holes in the bottom plate 29 and base and inserting the bolt 17.

Figure 2:
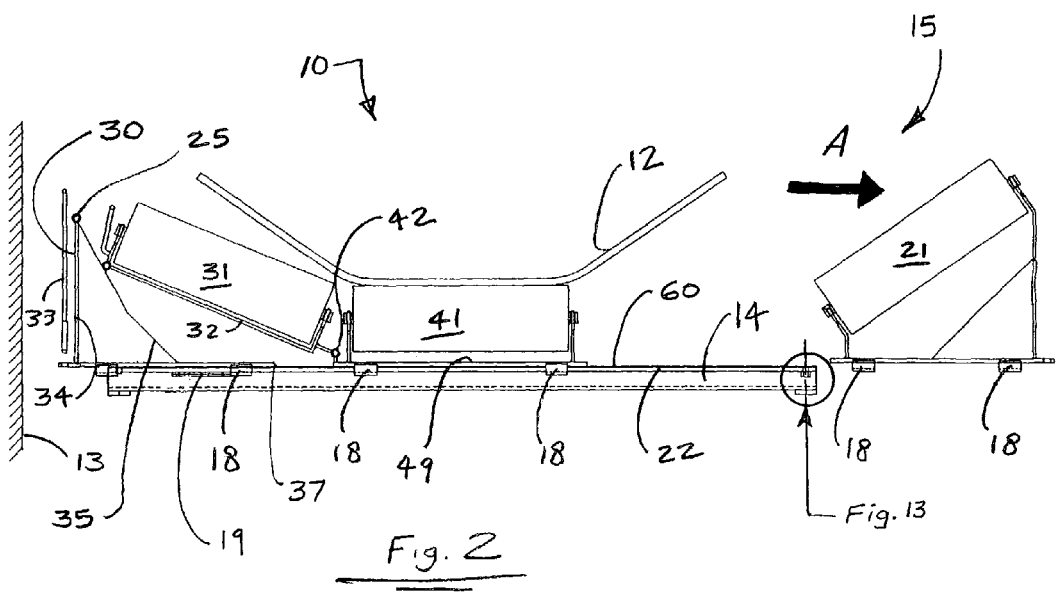
FIG. 2 is an elevational view of the conveyor belt support of FIG. 1, showing a first side roller removed from beneath the conveyor belt.

The bottom plate 29 of the frame 20 is configured to slide along the base 14 when the bolt 17 is removed. A plurality of channels or guides 18 on the bottom plate 29 slidably engage the cantilevered edges 22 of the base 14. The guides 18 limit displacement of the first frame 20 in the direction of the base 14, which is transverse to the longitudinal axis of the conveyor belt. As such, the sliding displacement of the first frame 20 is limited to a substantially linear path parallel to the longitudinal axis of the base 14. When the bolt 17 is removed from the holes in the button plate 29 and base 14, the first frame 20 may be removed from underneath the conveyor belt 12, as shown in FIG. 2.

Like the first side frame 20, the second side frame 30 and center frame 40 are configured to slide and be removed from the accessible side 15 of the conveyor belt 12. The center frame 40 has a bottom plate 49 with a plurality of guides 18 that slide along the cantilevered edges 22 of the base 14, similar to the first frame 20. The second side support frame 30 is connected to the center frame 40 by a coupling 42. The coupling 42 permits the second side frame 30 to be removed as the center frame 40 is removed from the access side 15.

Figure 8:
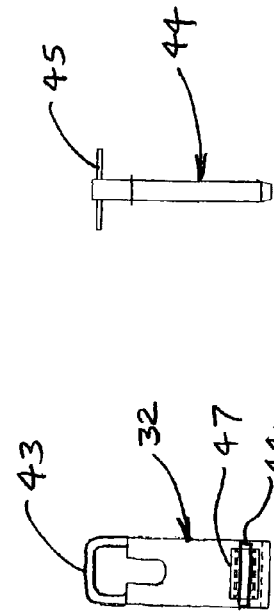
FIG. 8 is a second side elevational view of the frame taken along line 8-8 of FIG. 6.
Figure 9:
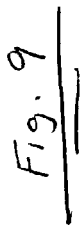
FIG. 9 is an elevational view of a pin that connects components of the conveyor belt support in FIG. 1.
Figure 10:
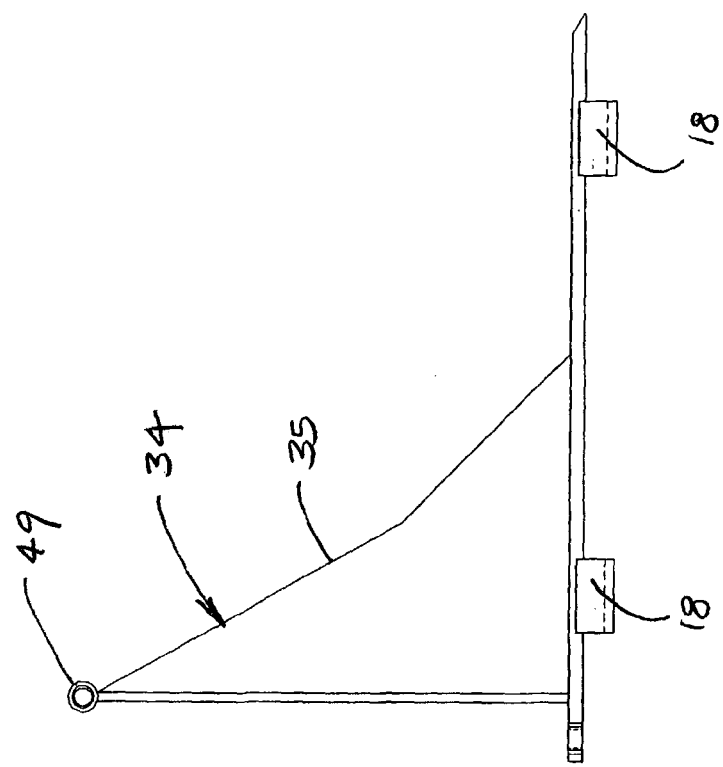
FIG. 10 is a front elevational view of a portion of the frame shown in FIG. 1 with the belt and rollers removed.
Figure 11:
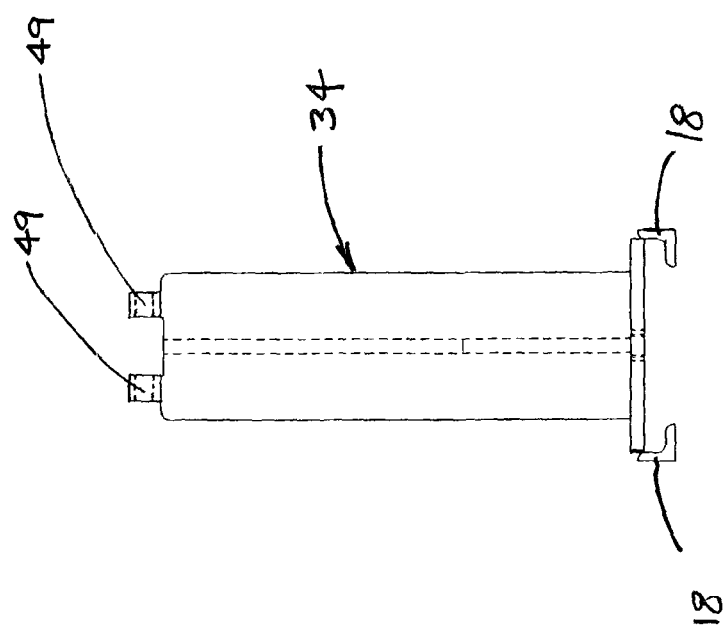
FIG. 11 is a side elevational view of the frame shown in FIG. 10.

Referring to FIGS. 4-6 and 8, the coupling 42 is shown as a hinged connection. The bottom plate 49 on the center frame 40 has a cylindrical housing 46 that couples with a cylindrical housing 47 on the second side frame 30 to form the hinge 42. The cylindrical housings 46 and 47 are adapted to receive a pin 44 that pivotally connects the center frame 40 and second side frame 30. The pin 44 is removable from the housings 46 and 47 to permit separation of the center frame 40 from the second side support frame 30, e.g., after the frames are removed from beneath the conveyor belt. Preferably, the pin 44 is provided with a T-shaped handle 45, as shown in FIG. 9. The T-shaped handle 45 facilitates easy removal of the pin 44 from the cylindrical housings 46 and 47.

Referring again to FIG. 2, the second side frame 30 comprises a bracket 32 that releasably engages a stand 34. The bracket 32 supports the second side roller 31, and the stand 34 supports the bracket in an inclined position so that the second side roller 31 engages the underside of the conveyor belt 12. The bracket 32 and stand 34 are connected by a coupling 25 near the top of the stand 34. The bracket 32 and stand 34 may be disengaged by reaching over the top of the conveyor belt from the access side 15 of the support 10. The coupling 25 may be any type of releasable connection. Referring to FIGS. 6, 7, 10 and 11, the coupling 25 is shown, e.g., as a hinged or pinned connection. The bracket 32 has a cylindrical housing 48 that couples with a cylindrical housing 49 on the stand 34 to form the hinge 25. The cylindrical housings 48 and 49 are adapted to receive a pin 50 shown in FIG. 7 that connects the bracket 32 and the stand 34 in a fixed inclined position. Preferably, the pin 50 is provided with a T-shaped handle, similar to the pin 44. In this arrangement, the T-shaped handle facilitates easy removal of the pin 50 from the housings 48 and 49.

Figure 3:
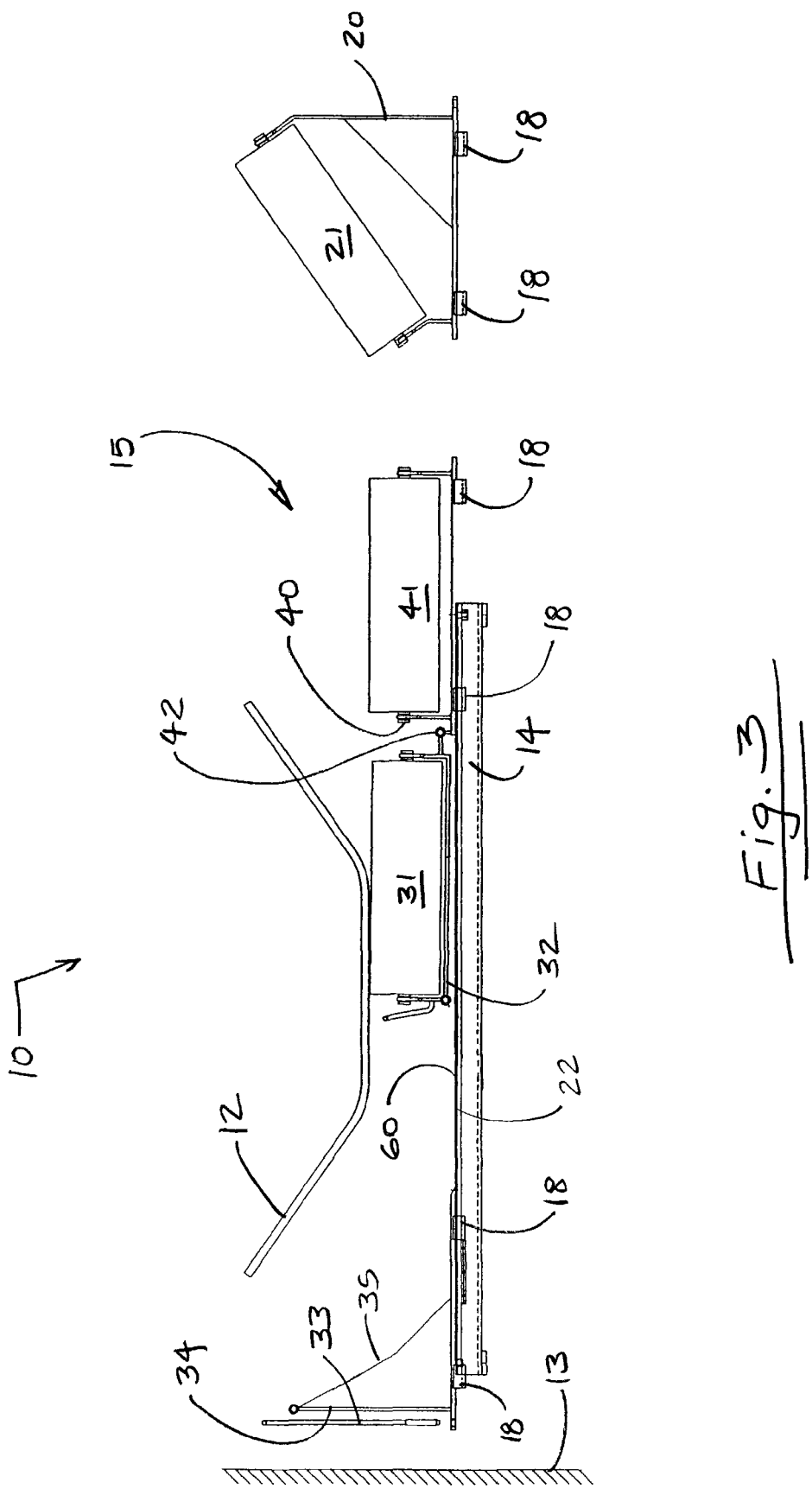
FIG. 3 is an elevational view of the conveyor belt support of FIG. 1, showing a first side roller removed from beneath the conveyor belt, and a center roller and second side roller partially removed from beneath the conveyor belt.
Figure 5:
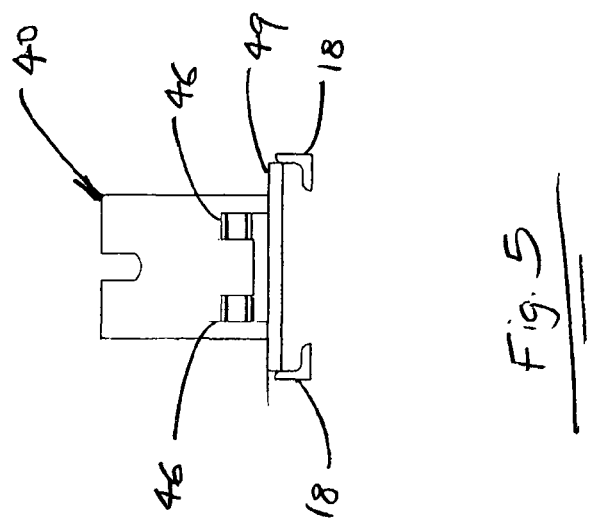
FIG. 5 is a sectional view of the frame taken along line 5-5 in FIG. 4.
Figure 4:
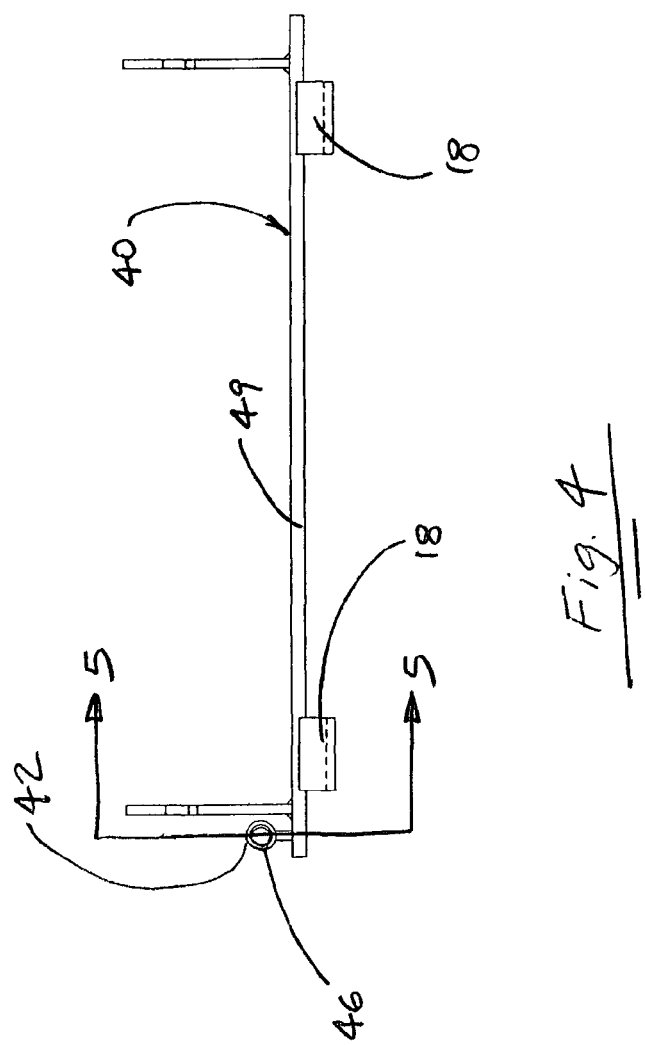
FIG. 4 is a front elevational view of a frame that supports the center roller in FIG. 3.

The stand 34 is movable between an engaged position and a disengaged position to permit removal of the second side roller 31 from beneath the conveyor belt. More specifically, the stand 34 slidably engages the top surface of the base 14 and slides outwardly and away from the conveyor belt 12 to permit removal of the second side roller 31, as shown in FIGS. 2-3. The stand 34 is slid outwardly from the belt 12 to provide adequate clearance for the second side roller 31, as discussed in more detail below. A plurality of guides 18 are on stand 34 to slidably engage the cantilevered edges 22 of the base 14 and limit displacement of the stand 34 in the direction of the longitudinal axis of the base. As such, the sliding displacement of the stand 34 is limited to a substantially linear path parallel to the longitudinal axis of the base 14. Axial displacement of the stand 34 on the base is limited by one or more detents 19 connected to the base 14. Each detent 19 is configured to abut the edges of the guides 18 on the stand 34 and limit axial displacement of the stand on the base. In FIG. 3, one detent 19 is shown between the guides 18 on the stand 34. The detent 19 limits the extent to which the stand 34 can be displaced inwardly and outwardly relative to the conveyor belt 12.

Figure 12:
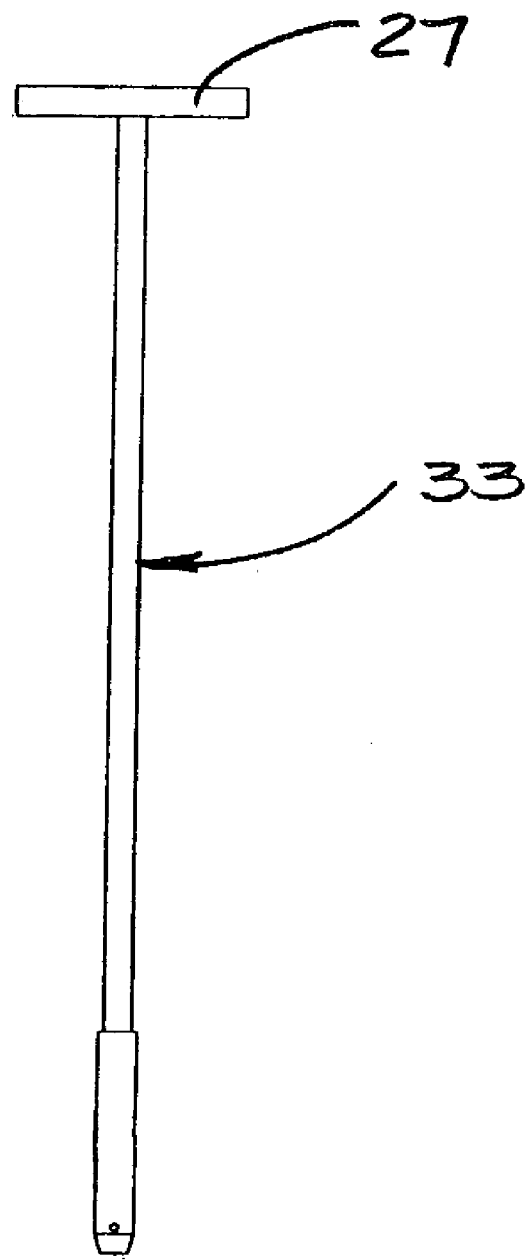
FIG. 12 is a front elevational view of an anchor pin that connects components in FIG. 1.

Referring to FIG. 1, a vertical anchor pin 33 extends through a slot in the bottom of the stand 34 and a slot in the base 14 to hold the stand in a fixed position relative to the base 14. The vertical anchor pin 33 may be manually removed from the slots to permit the stand 34 to slide outwardly from the conveyor belt during removal of the second side roller 31. Referring now to FIG. 12, the anchor pin 33 is preferably provided with a T-shaped handle 27 that facilitates easy removal of the anchor pin from the slots. Like the pin connection 25, the vertical anchor pin 33 extends toward the top of the conveyor belt 12 and may be accessed by reaching over the top of the conveyor belt from the access side 15 of the support.

Referring again to FIG. 2, the support assembly 10 is shown with the first frame 20 fully removed and the center frame 40 and second side roller 31 partially removed. The direction of removal of all three roller structures is represented by the arrow marked "A". The stand 34 comprises a ramp surface 35 configured to support the bracket 32 after the bracket is disengaged from the stand 34, and after the stand is slid outwardly away from the conveyor belt 12 toward the wall 13. A bottom edge of the bracket 32 slidably engages the ramp 35 and rides along the contour of the ramp during removal of the bracket and second side roller. In this arrangement, the ramp surface 35 is configured to guide the bracket 32 and second side roller 31 through a pivot angle as the bracket and second side roller are removed from underneath the belt 12. The second side roller 31 pivots downwardly toward a generally horizontal orientation so as to clear the underside of the conveyor belt 12 as it is pulled beneath the belt 15.

The stand 34 is configured to permit installation of the second side roller 30 and center frame 40 from the access side 15. The stand 34 has a toe 37 that tapers downwardly so as to form a relatively smooth transition with the top surface of the base 14, as shown in FIGS. 1-3. The bracket 32 is configured to be inserted beneath the conveyor belt 12, slid over the tapered toe 37 and advanced upwardly on the ramp 35 until the cylindrical housings 48 and 49 are aligned to receive the pin 50. The center frame 40 is configured to slide beneath the belt 12 following the bracket 32 as the bracket is advanced up the ramp 35. The guides 18 on the center frame 40 align with the cantilevered edges 22 on the base 14. In this manner, the center frame 40 slides over the base to a position beneath the conveyor belt 12.

The support assembly 10 may be used in heavy-duty material handling applications, as well as light-duty applications. In addition, the components of the support assembly 10 may be formed of any suitable durable material, such as steel, aluminum or engineered plastics. Metal surfaces that contact one another are preferably covered by a low friction non-metallic protective layer, such as a coating of ultra-high molecular weight polyethylene (HMWP). For example, the top surface of the base 14 may be coated with a HMWP layer 60, as shown in FIG. 1. The HMWP layer provides a smooth sliding engagement between the base 14 and frames 20, 30 and 40. In addition, the interior of housings, holes and slots may contain a liner of HMWP or a bushing formed of HMWP. In this manner, a smooth interface may be maintained between metal components which resists the effects of corrosion and other damage to metal surfaces that are caused by harsh environments.

Referring now to FIGS. 1-3, the operation of the support assembly 10 will be described. The support 10 is operable in many types of locations, including unobstructed locations or obstructed locations. The support 10 may be used in loading areas where a series of adjacent support assemblies are placed beneath a conveyor belt at close intervals, and/or in locations where access to one side of the conveyor belt is restricted. For purposes of this description, it will be assumed that the conveyor belt is installed adjacent to a wall 13, such that the conveyor belt has access from only one side 15 from which the underside of the conveyor belt can be reached, although such need not be the case.

Prior to removing any components, the conveyor belt 12 is preferably shut off to allow components of the support assembly 10 to be safely accessed, although this is not necessary to the operation of the invention. The bolt 17 is removed on the access side 15 to release the first frame 20 from the base. Once the bolt is removed, the first frame 20 is no longer fixed to the base 14. The first frame 20 may be removed by sliding the frame along the base 14 from the access side 15 until the frame is completely removed, as illustrated in FIG. 2. The first roller 21 may then be removed from the first frame 20 for servicing or replacement with another roller, as desired.

To remove the center frame 40 and second side frame 30, the coupling 25 that connects the bracket 32 and stand 34 on the second side frame is disengaged. As stated earlier, the coupling 25 is centrally located near the top of the side of the conveyor belt 12 adjacent the wall 13. In smaller conveyor belt installations, the coupling 25 may be accessed and disengaged by standing on the access side 15 of the conveyor belt 12 and reaching over the conveyor belt. In larger conveyor belt installations, the coupling 25 may be accessed by standing on top of the conveyor belt 12 and reaching over the edge of the belt, or by using a reach-extending tool. Once the coupling 25 is disengaged, the vertical anchor pin 33 is removed from the slots in the stand 34 and base 14. The anchor pin 33 may be accessed in the same manner that the coupling 25 is accessed. Once the anchor pin 33 is removed, the stand 34 is no longer fixed on the base and may be displaced outwardly toward the wall 13 and away from the belt 12. By displacing the stand 34 outwardly and away from the belt 12, the second side roller 31 moves downwardly and away from the belt 12 so that it is no longer pressed against the underside of the belt. In this arrangement, the second side roller 31 is pivoted for removal. Outward displacement of the stand 34 is limited by at least one detent 19 on the base 14 that abuts with one of the guides 18 on the bottom of the stand. The detent 19 limits the potential for the stand 34 to move too far from conveyor 12, which could cause, among other problems, banging or collision between the stand 34 and the nearby wall 13 when the stand is moved outwardly.

Figure 14:
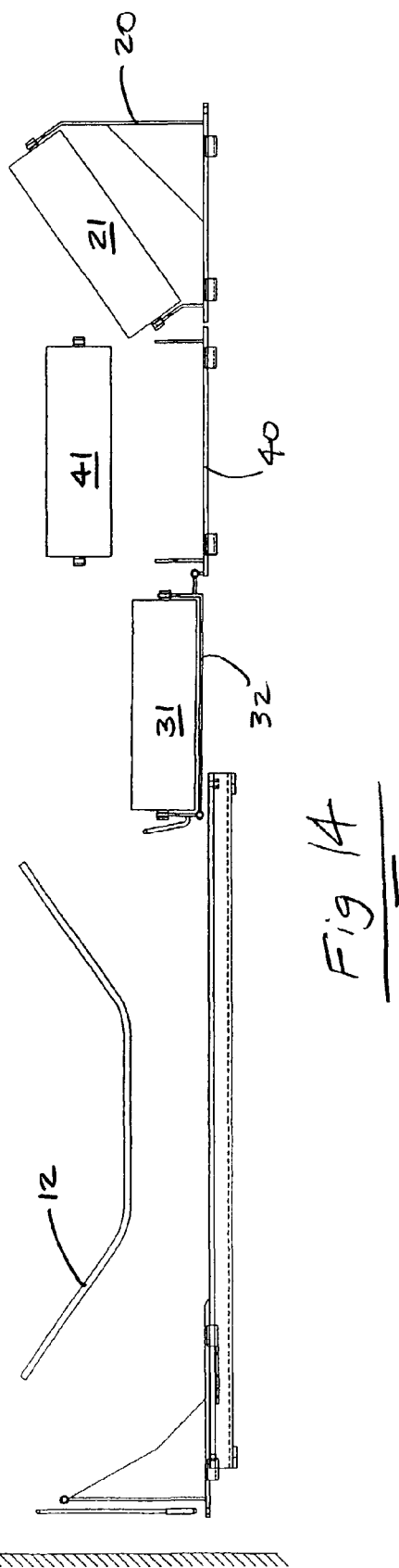
FIG. 14 is a partially exploded elevational view of the conveyor belt support assembly of FIG. 1, showing a first side roller, center roller, and a second side roller removed from beneath the conveyor belt.

With the stand 34 and ramp 35 moved outwardly, the second side roller 31 is no longer retained by the stand against the conveyor belt 12. As such, the bracket 32 and second side roller 31 are free to pivot downwardly and slide down the inclined surface of the ramp 35, as shown in FIG. 2. The center frame 40 is then pulled from the access side 15 and removed from beneath the conveyor belt 12, as shown in FIG. 3. As the center frame 40 is pulled out from beneath the belt 12, the stand 32 and second side roller 31 pivot down the ramp 35 until reaching a generally horizontal orientation. Once the horizontal orientation is obtained, the second side roller 31 may be pulled from beneath the underside of the belt 12 by continuing to apply a pulling force on the center frame 40. FIG. 14 shows the first side roller 21, center roller 41 and second side roller 31 removed from beneath the conveyor belt 12.

In some cases, it may not be necessary or desirable to remove the second side roller 31. For example, it may only be necessary to service the center roller 41 and not the second side roller. In such cases, the center frame 40 may be pulled out from beneath the conveyor belt 12 until the coupling 42 is exposed. The coupling 42 may then be disengaged, leaving the bracket 32 and second side roller 31 beneath the belt 12.

Installation of the frames and rollers is carried out essentially by following the removal procedure in reverse order. The stand 34 should be in the outwardly displaced position relative to the belt 12. The center frame 40 and the bracket 32 are connected together at the coupling 42. The bracket 32 and second side roller 31 are then inserted on base 14 beneath the belt 12, followed by the center frame 40. As the center frame 40 is inserted, the guides 18 on the center frame are aligned over the cantilevered edges 22 of the base 14 and then slid onto the base 14.

Figure 6:
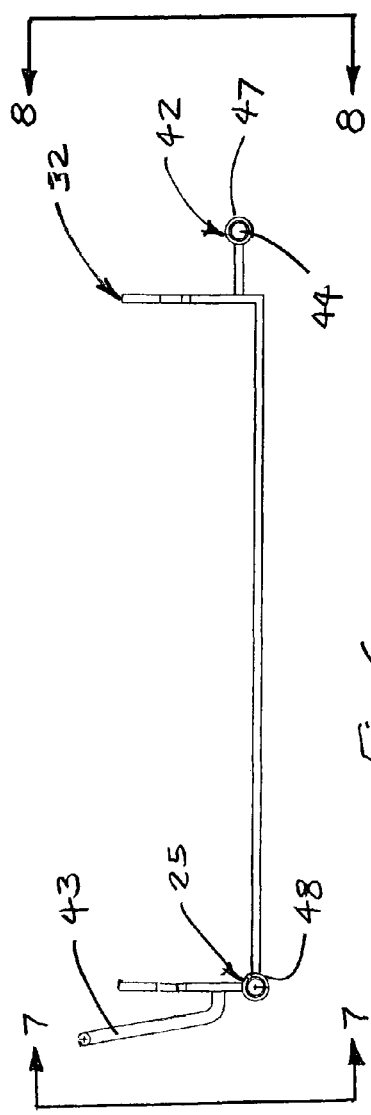
FIG. 6 is a front elevational view of a frame that supports the second side roller in FIG. 3.
Figure 7:
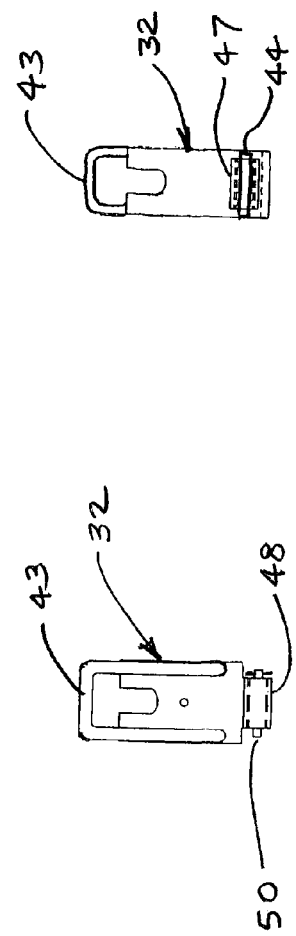
FIG. 7 is a first side elevational view of the frame taken along line 7-7 of FIG. 6.

The bracket 32 and center frame 40 are pushed beneath the conveyor belt 12 until the bottom edge of the bracket 32 contacts the tapered toe 37 of the stand 34. The tapered toe 37 provides a sufficiently smooth contour with the top of the base 14 as to permit the bottom edge of the bracket 32 to slide over the toe 37 onto the stand 34 and then to advance up the ramp 35. Where a hinge connection is used to connect the bracket 32 and the stand 34, the bracket is advanced up the ramp 35 until the cylindrical housings 48 and 49 are aligned. Depending on the size (width) of the conveyor belt 12, the operator may require assistance from one or more individuals to maneuver the bracket 32 up the ramp 35 and into a position where it can be connected with the stand 34. In some cases, it may be necessary to maneuver the bracket 32 into position by accessing the bracket from the top of the belt. A handle 43 may be provided on the end of the bracket 32 for this purpose, as shown in FIGS. 6-8. The bracket 32 may be pulled by the handle and maneuvered so that the cylindrical housings 48 and 49 are aligned. Once the housings 48 and 49 are aligned, the pin 50 may be inserted through the housings to connect the bracket 32 and the stand 34.

At this point, the second side roller 31 and center roller 41 are disposed in the proper orientation to conform to the underside or contour of the belt. The top of the stand 34 is then moved inwardly toward the belt. As the stand 34 is pulled inwardly, the stand and center bracket 40 slide inwardly on the base 14. The stand 34 is moved inwardly until the second side roller 31 and center roller 41 are set beneath the belt 12 in a supporting position. In addition, the stand 34 is moved inwardly so that the slot in the stand aligns with the slot in the base 14. Preferably, the stand 34 and center frame 40 reach the proper position when a guide 18 on the stand engages the detent 19 on the base. In this manner, the detent 19 stops the stand 34 at the proper position, preventing the operator from moving the stand past its proper position. Once the rollers are properly set and the slots are aligned, the vertical anchor pin 33 is inserted down through the slots to fix the position of the stand 34 on the base 14.

The first side frame 20 and first side roller 21 are installed beneath the belt 12 by aligning the guides 18 on the first frame with the cantilevered edges 22 of the base 14. Once the guides 18 are aligned with the cantilevered edges 22, the first side frame 20 is slid along the base 14 until the first side roller 21 engages the underside of the belt 12. The first side frame 20 is then secured to the base 14 in a fixed position. Where a bolt or pin 17 is used to secure the first frame 20 to the base 14, the bolt hole on the bottom plate 29 of the frame is aligned with the hole in the base 14. The bolt or pin 17 may then be inserted through the holes and secured to hold the first frame 20 in a fixed position on the base 14.

Figure 15:
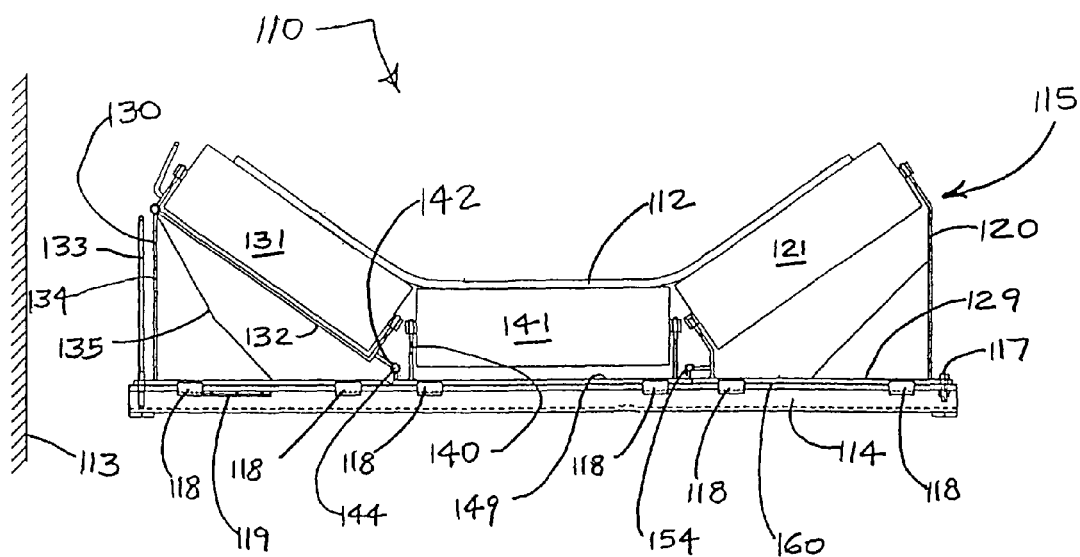
FIG. 15 is an elevational view of an alternate conveyor belt support in accordance with the present invention, shown supporting a conveyor belt in a trough-shaped manner.

The terms and expressions which have been employed are used as terms of description and not of limitation. There is no intention in the use of such terms and expressions of excluding any equivalents of the features shown and described or portions thereof. It is recognized, therefore, that various modifications are possible within the scope and spirit of the invention. For example, the first side frame may be connected to the center frame by an optional coupling, as shown in FIG. 15, similar to the coupling between the center frame and the second side frame. In FIG. 15, an alternate support 110 includes a first side roller 121, a second side roller 131 and a center roller 141. The first side roller 121 and center roller 141 are connected by a coupling 154, and the second side roller 131 and center roller are connected by a similar coupling 142. Support 110 has many of the same components described in connection with FIG. 1. Therefore, elements in FIG. 15 that correspond with components in FIG. 1 are identified by the same reference number used in FIG. 1 plus 100.

Alternatively, the first side frame, center frame and second side frame may remain separate from one another without couplings. In such a case, the second side roller may be installed and removed from above the belt, or by using a long hook or other implement underneath the belt to install and remove the second side roller from the accessible side of the belt.

Although the frames in the support assembly have been illustrated with one roller on each frame, the frames may each contain more than one roller to support the underside of the conveyor belt. This may be desirable for larger conveyor belts. Moreover, other types of guide elements may be used in place of rollers on the frames, including slider bars, bearing blocks and other elements supported by the frames.

The stand 34 and ramp 35 may be fixed relative to the base rather than displaceable outwardly. This may be desired when the bracket and second side roller are not connected to the center frame, and the belt permits removal of the bracket and second side roller from the top of the belt 12.

The described method of installing and removing the support components is not intended to represent the only method for installing and removing the support components. For instance, the first side frame 20 and first side roller 21 may be installed beneath the belt 12 and secured on the base 14 prior to setting the position of the center roller 41 and second side roller 31. More specifically, the first frame 20 may be bolted onto the frame 14 beneath the belt 12 prior to moving the stand 34 inwardly to secure the second side roller against the belt. In this way, the first frame 20 acts as a stop that abuts the center frame to limit displacement of the center frame and second side frame when the stand 34 is moved inwardly. This would eliminate the need for having a guide 18 installed on the second side frame to limit inward displacement of the stand 34. Accordingly, the invention incorporates variations that fall within the scope of the following claims.

I claim:

1. A support assembly for supporting a conveyor belt in a trough-shape, said support assembly being mounted on a base and being accessible from at least one side of the conveyor belt, comprising:
   a first guide element mounted on a first frame in an inclined position for supporting a one side of the conveyor belt, said first frame disposed on top of the base and removable from the one accessible side of the conveyor belt; and
   a second guide element mounted on a second frame in an inclined position for supporting another side of the conveyor belt, said second frame disposed on top of the base and removable from the one accessible side of the conveyor belt, said second guide element being interconnected with said first guide element by one or more couplings to permit said first and second guide elements to be installed and removed from said one accessible side as a unit;
   wherein the first frame and second frame are aligned in a row extending generally transverse to the axis of the conveyor belt, said first frame and second frame being aligned and being removable from the one accessible side of the conveyor belt.

2. The support assembly of claim 1, wherein the first and second guide elements each comprise one of a roller, a slider bar and a bearing block.

3. The support assembly of claim 1, wherein the first and second guide elements each comprise at least one roller.

4. A support assembly for supporting a conveyor belt in a trough-shape, said support assembly being mounted on a base beneath the conveyor belt and having an accessible side and an inaccessible side comprising:
   a first guide element mounted on a first frame in an inclined position adjacent the accessible side, said first frame disposed on top of the base and removable from the accessible side of the conveyor belt;
   a second guide element mounted on a second frame in an inclined position adjacent the inaccessible side, said second frame disposed on top of the base and removable from the accessible side of the conveyor belt; and
   a ramp for supporting the second frame beneath the belt adjacent the inaccessible side, said ramp being slidable on the base between a disengaged position, in which the second guide element is moved outwardly and away from the belt, and an engaged position, in which the second guide element is positioned beneath the belt,
   wherein, upon displacement of the ramp to the disengaged position, a clearance is formed between the second guide element and the conveyor belt that permits movement of the second frame and second guide element down the ramp and beneath the conveyor belt for removal from the accessible side of the conveyor belt.

5. The support assembly of claim 4, wherein the first and second guide elements each comprise one of a roller, a slider bar and a bearing block.

6. The support assembly of claim 4, wherein the first and second guide elements each comprise at least one roller.

7. A support assembly for installation beneath a conveyor belt having an accessible side, said support assembly comprising:
   a track beneath the conveyor belt and extending generally transverse to the orientation of the conveyor belt;
   a first guide element mounted in an inclined position beneath the belt, said first guide element slidably supported on the track and removable from the accessible side of the conveyor belt; and
   a second guide element mounted in an inclined position beneath the conveyor belt, said second guide element slidably supported on the track and removable from the accessible side of the conveyor belt, said second guide element being interconnected with said first guide element by one or more couplings to permit said first and second guide elements to be installed and removed from said one accessible side as a unit;
   wherein the first and second guide elements are aligned along the track in a generally vertical orientation and are slidable beneath the belt to facilitate removal of the guide elements from beneath the belt.

8. The support assembly of claim 7, wherein the first and second guide elements each comprise one of a roller, a slider bar and a bearing block.

9. The support assembly of claim 7, wherein the first and second guide elements each comprise at least one roller.

10. A support assembly for installation beneath a trough-shaped conveyor belt supported in a trough-shape and having an accessible side and an inaccessible side, said support assembly comprising:
    a track beneath the conveyor belt and extending generally transverse to the orientation of the conveyor belt;
    a first guide element mounted in an inclined position beneath the belt, said first guide element slidably supported on the track and removable from the accessible side of the conveyor belt;
    a second guide element mounted in an inclined position beneath the conveyor belt adjacent the inaccessible side of the conveyor belt, said second guide element slidably supported on the track and removable from the accessible side of the conveyor belt; and
    a ramp for supporting the second guide element beneath the conveyor belt adjacent the inaccessible side, said ramp being slidable on the track between a disengaged position, in which the ramp and second guide element are movable outwardly and away from the belt, and an engaged position, in which the ramp and second guide element are positioned beneath the belt,
    wherein, upon moving the ramp to the disengaged position, a clearance is formed between the second guide element and the conveyor belt that permits movement of the second guide element down the ramp and along the track to facilitate removal of the second guide element from the accessible side of the conveyor belt.

11. The support assembly of claim 10, wherein the first and second guide elements each comprise one of a roller, a slider bar and a bearing block.

12. The support assembly of claim 10, wherein the first and second guide elements each comprise at least one roller.

13. A support assembly for installation beneath a conveyor belt supported in a trough-shape and having an accessible side and an inaccessible side, said support assembly comprising:
    a track beneath the conveyor belt, said track extending generally transverse to the orientation of the conveyor belt;
    a first guide element mounted in an inclined position beneath the belt, said first guide element slidably supported on the track and removable from the accessible side of the conveyor belt;
    a second guide element mounted in an inclined position beneath the conveyor belt adjacent the inaccessible side of the conveyor belt, said second guide element slidably supported on the track and removable from the accessible side of the conveyor belt;

a third guide element mounted in a generally horizontal position beneath a central portion of the conveyor belt between said first guide element and said second guide element, said third guide element being pivotally connected to said second guide element to facilitate installation and removal of the second and third guide elements as a unit.

14. The support assembly of claim 13 comprising a ramp for supporting said second guide element beneath the conveyor belt adjacent the inaccessible side, said ramp being slidable on the track between a disengaged position, in which the ramp and second guide element are movable outwardly and away from the belt, and an engaged position, in which the ramp and second guide element are positioned beneath the belt, wherein, upon moving the ramp to the disengaged position, a clearance is formed between the second guide element and the conveyor belt that permits movement of the second guide element down the ramp and along the track to facilitate removal of the second guide element and third guide element from the accessible side of the conveyor belt as a unit.

15. The support assembly of claim 13, wherein each guide element comprises one of a roller, a slider bar and a bearing block.

16. The support assembly of claim 13, wherein each guide element comprises at least one roller.

17. The support assembly of claim 13, wherein the first guide element is coupled to said third guide element to facilitate installation and removal of the first, second and third guide elements as a unit.

* * * * *